B. BRUKWICKI.
ELECTROMAGNETIC REVERSING GEAR.
APPLICATION FILED MAR. 28, 1912.
1,044,984.
Patented Nov. 19, 1912.
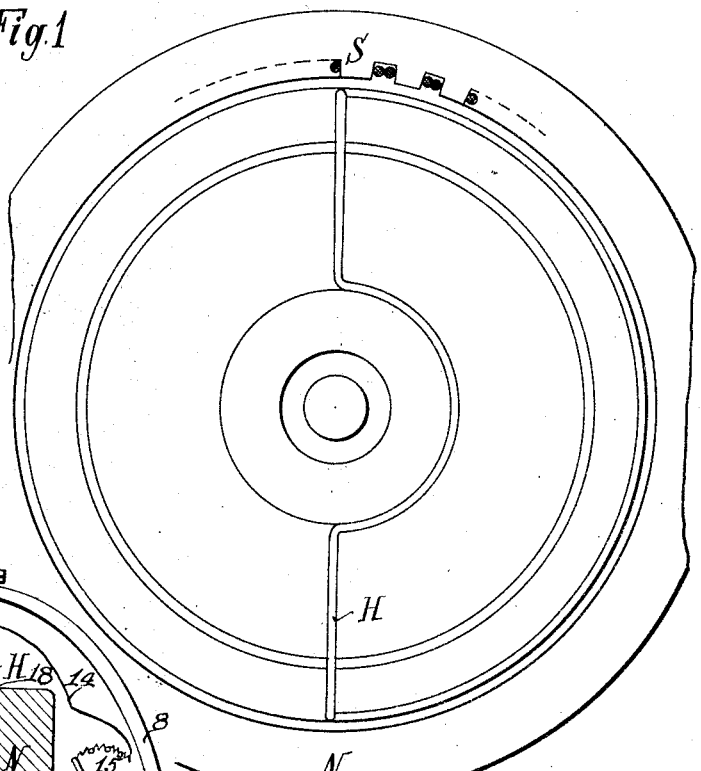
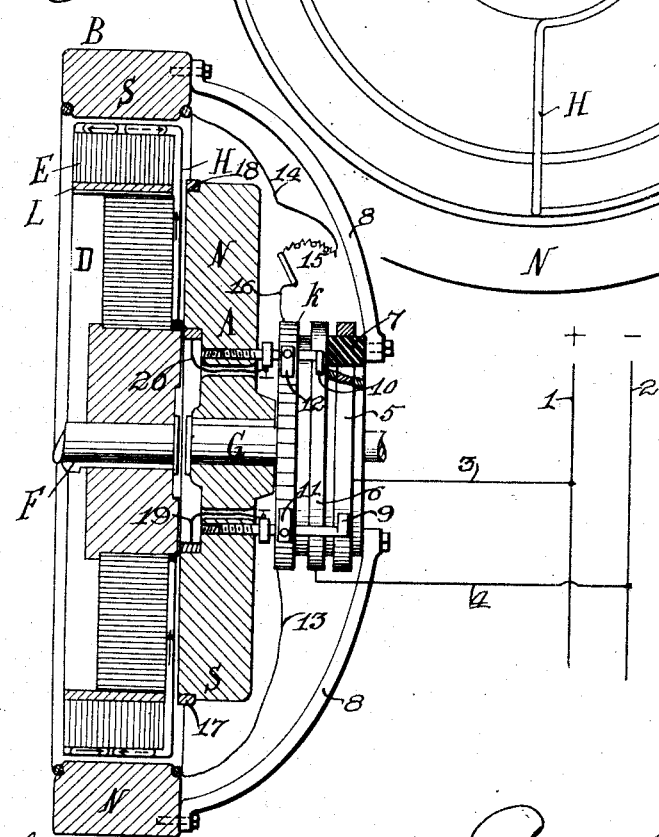

UNITED STATES PATENT OFFICE.

BRONISLAW BRUKWICKI, OF RAKOWO, NEAR NIEHOF, GERMANY.

ELECTROMAGNETIC REVERSING-GEAR.

1,044,984.   Specification of Letters Patent.   Patented Nov. 19, 1912.

Application filed March 28, 1912. Serial No. 686,884.

*To all whom it may concern:*

Be it known that I, BRONISLAW BRUKWICKI, a subject of the German Emperor, and residing at Rakowo, near Niehof, Kreis Wongrowitz, Germany, have invented certain new and useful Improvements in Electromagnetic Reversing-Gears, of which the following is a specification.

This invention relates to improvements in electro-magnetic gears, whereby without it being necessary to reverse the driving machine or to weaken the torque exerted by the same, the driven machine can be rotated at all desired speeds in either direction.

The invention consists in an improved electro-magnetic reversing gear in which the armatures of two synchronous machines are electrically and mechanically connected to a short circuited armature winding in which are induced by means of two magnetic fields, rotating synchronously to each other, electro-magnetic forces the resultant action of which rotates forward or backward a magnet core mounted on the driven shaft and generating one of the magnetic fields, whereby the closest regulation of the revolutions can be obtained by altering the excitation of one of the magnet cores while the excitation of the other remains constant.

One example of the improved reversing gear according to the invention is illustrated in the accompanying drawings in which, Figure 1 is a front elevation, and Fig. 2 an axial section.

On the driving shaft F is mounted the armature consisting of two parts connected to each other, a part D and a part E. Between the two there is fitted a steel ring L. The part D is of wound band iron while the part E consists in known manner of iron rings. The purpose of this arrangement of the parts D and E is to facilitate the passage through the armature of the lines of force in the direction of the laminations of these parts permeating the fixed magnet core B and the magnet core A mounted on the driven shaft.

On the armature there is arranged a winding H short circuited on itself, which as can be seen from the drawings is cut both by the lines of force of the magnet core A and those of the magnet core B during the rotation. Both magnet cores have projecting poles. The pole pitch of B corresponds to that of A. In the interests of simplicity the magnet core A is illustrated as having two poles only. The excitation of the magnet cores A and B is derived from a separate current source, the magnet A being excited with continuous current in the usual manner and kept at constant field strength, while the magnet core B is supplied with excitation current through slip rings, adjustable brushes, and a fixed commutator K. The commutator brushes are diametrically opposite to each other and extend inward to the commutator segments. These latter are connected to the exciting winding of the magnet core B, which is a usual continuous current armature winding. On tracing the circuit followed by the current energizing the fixed magnet core B, which enters at one of the shifting brushes on the fixed commutator K and after flowing through the winding flows out by the other brush, it is seen that the north and south poles induced by the flow of the current through the winding of the magnet core B shift uniformly with the brushes, and therefore also with the poles of the magnet core A, since the brushes are connected to the magnet core as can be seen from the drawings. It is thus possible by suitable shifting of the brushes to arrange for example that a south pole of the magnet core A will be always opposite to a north pole of B or by reversal of the direction of one of the exciting currents that similar poles are always opposite to each other.

From this arrangement the following method of operation is obtained. The manner in which the exciting current is supplied to the magnet windings will now be more particularly described. The current is derived from any suitable source to which the leads or main wires 1 and 2 are connected, and from these main wires 3 and 4, respectively, that connect with the stationary slip rings 5 and 6. These rings, together with the commutator K, are mounted on a body of insulation or other suitable support 7, which support is stationary by being mounted on brackets 8 secured to the stationary magnet B. The brushes 9 and 10 bear on the slip rings 5 and 6, respectively, and on or connected with these slip ring brushes are the commutator brushes 11 and 12, so that current will pass through the wire 3, slip ring 5, brushes 9 and 11, wire 13, windings of the magnet B, wire 14, rheostat 15, wire 16, commutator K, brushes 12 and 10 and wire 4. As the commutator brushes rotate with the magnet A which carries the brushes, it is obvious that the magnetic poles of the magnet B will rotate correspondingly. The windings 17 and 18 of the magnet B are supplied with exciting current through the brushes 9 and 10, by such brushes being connected by wires or other connections 19 and 20 with the windings 17 and 18. The rheostat serves to vary the exciting current in the magnet B for obtaining different speed ratios between the driving and driven elements F and G. Similar means may be provided for reversing the current in one of the magnet windings to reverse the direction or rotation of the driven element. When the armature D, E is set in rotation owing to electrodynamic reaction between the winding H and the magnet core A, the latter is carried around also. At no load there is synchronism between A and D E apart from the very small slip due to bearing friction. On loading the magnet core A lags behind the armature D E until the current generated in the winding H is sufficient to provide the corresponding torque. When the exciting current of the magnet winding B has such a direction that dissimilar poles of A and B are opposite to each other, and the current in the winding H due to the load for example, produced by an electro-motive force having the magnitude and direction of the full lines with arrows, and when by corresponding excitation of the magnet core B an equal and opposing electromotive force is induced in the winding H, as shown by the dotted lines with arrow, the slip is increased and the armature gradually brought to rest since the electro-motive force induced hereby owing to the cutting of the lines of force issuing from A, is compensated by the equal and opposing E. M. F. impressed by the winding of the magnet core B. Conversely for gradually increasing the speed from rest it is merely necessary to gradually diminish the effect of the exciting winding of B. By increasing the opposing electromotive force generated by the magnet core B beyond the amount required to bring the magnet core A to rest, this latter is compelled to rotate in the reverse direction in order to counteract the electro-motive force impressed on the winding H. On reversal of the direction of the exciting current which is to be varied, similar poles come opposite each other. An electro-magnetic force generated in the winding H by the excitation has as consequence a summation of the electro-motive forces generated by the two magnet cores, and the magnet cores A tends to rotate faster than the armature D E as it is only in this manner that it can effectively counteract the electro-motive force impressed on the winding H by the magnet core B, which E. M. F. can be only increased if the said magnet core A lags.

Obviously the two magnet cores may exchange positions, the casting A taking the position of B and the wound laminated core B rotate on the shaft G along with its commutator K. This arrangement gives better facilities for supplying the exciting current, and improved commutation, since the brushes are at rest.

The construction described is particularly well adapted for use with marine turbines and power driven vehicles and vessels of all types since it eliminates change speed gears, shafts, couplings, chain or bevel wheel gears and the like with their associated rods and levers, also the fly-wheel and differential gear.

What I claim as new and desire to secure by Letters Patent is:

1. An electro-magnetic gear comprising a rotatable driving element having a short-circuited winding, a driven element in the form of a magnet operating inductively on the said winding and adapted to be driven by the driving element, a stationary magnet disposed in inductive relation to the said winding, and means for varying the relative magneto motive force of the magnets to control the speed of the driven magnet.

2. A device of the class described comprising a driving element having different magnetic portions, a short-circuited winding on the said portions, a driven element in the form of a magnet inductively related to one of the said portions, a fixed magnet inductively related to the other portion of the driving element, and means for variably exciting the magnets relative to each other for obtaining a variable speed of the driven element.

3. A magnetic speed-changing device comprising a driving element having short-circuited windings, magnets relatively rotated to each other and inductively related to the said windings, said windings having poles of corresponding pitch, means for supplying exciting current of uniform strength to one magnet, and means for supplying an exciting current of variable strength to the other magnet whereby the speed of rotation of the movable magnet is controlled.

4. A magnetic speed-changing device comprising a driving element having a short-circuited winding, a fixed magnet inductively related to the winding, a driven magnet inductively related to the winding, said magnets being of corresponding pole pitch, stationary slip rings connected with the source of current, means for supplying exciting current from the slip rings to the windings of the rotating magnet, a commutator associated with the slip rings and electrically connected therewith, and means for controlling the strength of the current supply to the fixed magnet from the commutator.

5. A magnetic speed-changing device comprising a driving rotor having a short-circuited winding, a driven rotor in the form of a magnet having exciting windings and poles inductively related to the winding of the driving rotor, a fixed magnet surrounding the driving rotor and provided with windings inductively related to the driving rotor winding, slip rings fixed with respect to the fixed magnet, a commutator having its segments connected with the windings of the fixed magnet, brushes carried by the rotor magnet to engage the slip rings and the commutator, and connections between the brushes and windings of the rotor magnet.

6. A magnetic speed-changing device comprising a driven element having two concentric magnetic portions or sections, a rotary driven magnet having its poles opposite the inner section of the driving rotor, exciting windings for the said poles, a fixed magnet surrounding the outer section of the driving rotor, polar windings on the fixed magnet, a short-circuited winding on the driving rotor in inductive relation to the poles of the said magnets, and means for supplying current to the windings of the magnets, one of said means being controllable to vary the relative excitation of the magnets and thereby the speed of the driven magnet.

7. In a magnetic speed-changing device of the class described, a driving rotor comprising an inner magnetic section, a ring surrounding the same, an outer magnetic section carried by the ring, and a short-circuited winding disposed over both sections.

8. In a magnetic speed-changing device, a driving rotor comprising an inner section formed of a wound magnetic-strip material, a ring surrounding the same and carried thereby, an outer section formed of magnetic rings or laminations mounted on and surrounding the said ring, and a short-circuited winding disposed over the said sections.

In testimony whereof I affix my signature in presence of two witnesses.

BRONISLAW BRUKWICKI.

Witnesses:
JAN BRUKWICKI,
ROMAN BRUKWICKI.